United States Patent Office 3,033,804
Patented May 8, 1962

3,033,804
FIRE-RESISTANT POLYCHLOROPRENE FOAM RUBBER AND METHOD OF MAKING SAME
Eugene J. Bethe, Mishawaka, and Thomas I. Haggerty, South Bend, Ind., assignors to United States Rubber Company, New York, N.Y., a corporation of New Jersey
No Drawing. Filed Mar. 14, 1960, Ser. No. 14,493
14 Claims. (Cl. 260—2.5)

The present invention relates to a fire-retardant wash composition and more particularly to a method for improving the combustion-resistance of neoprene foam rubber therewith.

A known treatment of neoprene foam rubber with a fireproofing composition involves the incorporation of a melamine-aldehyde condensation product or a mixture of such product with a $P_2O_5$-releasing compound in the foam. It has been found that aqueous impregnating washes of this melamine composition, however, have an extremely short pot-life of 1–3 hours, thereby creating many difficulties in mixing, storing and using. Due to this short pot-life, any unused wash in a particular run reacts, sets up and requires dumping as scrap, resulting in increased expenditures of time, labor and money in commercial operations.

We have now found a new fire-retardant composition for improving the combustion-resistance of neoprene foam rubber, which composition does not exhibit the aforementioned disadvantages.

An object of this invention, therefore, is the provision of a fire-retardant wash composition for improving the combustion resistance of neoprene foam rubber.

Another object is the provision of a fire-retardant wash composition with an improved wet storage life.

A further object is to produce a substantially fireproofed neoprene foam rubber.

Still another object is to prevent or inhibit the propagation of flameless combustion in neoprene foam rubber.

Other and related objects will become apparent as the description of the invention proceeds.

The term "neoprene" is a generic one which denotes a synthetic rubber-like polymer made by polymerizing chloroprene (2-chloro-1,3-butadiene) or by polymerizing a mixture of polymerizable monomers, the major component of which is chloroprene. By common usage, and as used herein, the term has been broadened to include commercial rubber-like compounds, such as those made from latex mixtures of neoprene with natural or synthetic rubbers, the major elastomeric constituent of which is neoprene as defined above.

The method of making foam rubber from a neoprene latex is conventional and similar to that used in making foam rubber from natural or other synthetic rubber latices.

Due to its high chlorine content, neoprene possesses a high degree of flame resistance, as distinguished from natural rubber and most other synthetic rubbers. However, although neoprene foam, in the absence of highly flammable compounding ingredients, does not propagate a flame, it does burn if held in a flame, and does char when subjected to high temperatures of about 200° C. or more or when in contact with a red hot metal object.

This latter characteristic is a generally accepted basis for a fire resistance test, hereinafter referred to as the "hot bolt test," for synthetic cellular rubbers derived from latex foam, which test is outlined in the military specification MIL–R–0020092C (August 11, 1958), issued by the Bureau of Ships. According to the specification, a foam rubber sample measuring 12" x 12" x 4" is placed upon a ¼ inch mesh wire screen supported on a metal tripod. A headless ½ inch diameter steel bolt weighing 4 ounces (+0.1 oz.) is heated to 800° C. (+10° C.) and then placed on approximately the center of the sample. For a successful test, the sample must not flame for more than 10 seconds as a result of placement of the hot bolt on its surface. Further, all smoldering or smoking must cease within 15 minutes, and the total char volume must not exceed 25 cubic inches, not extend to the bottom of the sample.

The "hot bolt test" is an extremely rugged one to pass inasmuch as it is not only necessary to prevent the foam rubber sample from flaming and to control the smoke, but it is also required that the foam rubber support the bolt so that it does not pass through the sample. In the examples below, passage of the test was made more difficult by using samples of neoprene foam rubber that measured 12" x 12" x 3".

In accordance with the invention, a vastly improved fire-resistance is imparted to neoprene foam rubber by impregnating said foam with an aqueous mixture comprised of the following ingredients: (A) urea-formaldehyde resin, (B) dihydroxybenzene, (C) an excess of formaldehyde, and (D) a spumific. The amount of water in the mixture may be altered to suit the total solids content desired.

The resins that are operative in this invention are water-soluble urea-formaldehyde resins having a ratio of 1 mole of urea to 1–2.5 moles of formaldehyde. The urea-formaldehyde resins are suitably formed from a mixture of urea and a source of formaldehyde, such as paraformaldehyde, in an aqueous solution. The resulting urea-formaldehyde resin solutions, including various proprietary aqueous solutions of urea-formaldehyde resin that are commercially available, are used in accordance with our invention.

All three of the dihydroxybenzenes are suitable for the purposes of this invention. These are: 1,4-dihydroxybenzene (hydroquinone), 1,3-dihydroxybenzene (resorcinol), and 1,2-dihydroxybenzene (catechol). Of the three, 1,4-dihydroxybenzene is preferred for two reasons. First, 1,3-dihydroxybenzene has a tendency to form a very fine flocculation in the wash solution, and second, the cost of 1,2-dihydroxybenzene is considerably higher than that of 1,4-dihydroxybenzene. As shown in Example 2, below, the presence of dihydroxybenzene in the wash composition of this invention is essential for imparting fire-resistant qualities to neoprene foam rubber treated therewith.

Although solutions of water soluble urea-formaldehyde resins normally contain additional, unbound formaldehyde, a small amount of excess formaldehyde, separately added to our wash composition is preferred, though not critical. In preparing a wash solution according to the invention, the excess portion of formaldehyde, dihydroxybenzene and urea-formaldehyde resin are mixed together and heated for a short time to cause an interaction between the components. It is believed that the excess formaldehyde solubilizes the dihydroxybenzene through methylolation and crosslinks it into the resin structure. A separately added portion of 10–40 parts by weight, based on 100 parts of urea-formaldehyde resin, of a 37% aqueous solution of formaldehyde and heating of the resulting composition at 180° F. for approximately 10 minutes has been found to be suitable. This excess portion of formaldehyde solution is equivalent to about 3–15 parts by weight of formaldehyde in the wash per 100 parts of dry resin.

Among the spumifics that we have found suitable in this invention are compounds such as diammonium phosphate, monoammonium phosphate, phosphoric acid, ammonium sulfate, and ammonium chloride, all of which are acidic in nature. When neoprene foam rubber has been treated with our wash composition and subjected to combustion temperatures, these compounds assist in the conversion of the resinous solids into a fire-resistant, carbonaceous, crust-like foam and also assist in reducing fume ignition. We have found that an allowable range for these compounds in the wash composition of this invention is from about 10 to about 35 parts by weight, and preferably from about 15 to about 30 parts by weight, based on 100 parts of dry urea-formaldehyde resin.

It has been found that the addition of a catalyst, which is an accelerator for the further condensation reaction of urea-formaldehyde resins, is desirable to promote a higher cure rate for the urea-formaldehyde-dihydroxybenzene system. This type of catalyst may be found classified in "Amino Resins" by John F. Blair, Reinhold Publishing Corp., 1959, p. 165. Typical of such catalysts are the aliphatic substituted alkanol amine salts. The addition of a catalyst, however, is not critical and can be eliminated because of the high concentration of spumific in our wash composition which, because of its acidic character, is also an accelerator for the cure of urea-formaldehyde resins.

Table I illustrates the preferred and allowable ranges for the components falling within the scope of this invention. In all cases the weights given are dry weights, except for the formaldehyde solution, for which a wet weight is given.

TABLE I

| Components | Parts by Weight | |
|---|---|---|
| | Preferable Range | Allowable Range |
| Urea-formaldehyde resin | 100 | 100 |
| Dihydroxybenzene | 15–40 | 10–40 |
| 37% Solution formaldehyde | 30–35 | 10–40 |
| Spumific | 15–30 | 10–35 |
| Catalyst | 1–3 | 0–5 |
| Water, q.s.[1] to provide percent total solids content desired | | |

[1] Quantum sufficit—as much as is sufficient.

In making up a wash solution, the amount of water that may be added to a formulation of components depends upon the total solids percentage of the wash that is desired. We have found an approximately 36 percent solids solution to be generally suitable for the purposes of this invention, but this is not a critical figure, as the concentration of total solids in the wash solution may range from about 2 to about 50 percent. It should be recognized that different dry weight pick-ups of solids in the treated neoprene foam can be obtained by using washes of various percent solids content. The dry weight pick-up can be governed, by using a known percent solids solution as the wash, and by allowing an appropriate amount of the wash solution to remain in the foam article (wet pick-up). A diluted solution with a low percentage of total solids may be used when a small amount of dry weight pick-up is desired and, conversely, when higher amounts of dry weight pick-up are desired, either a more concentrated solution or repeated treatments with a diluted solution may be utilized. Thus, the concentration of ingredients in the wash solution and the wet pick-up may be varied considerably provided that the neoprene foam is impregnated with a sufficient amount of the wash solution to provide the desired improvement in the fire-resistance of the foam.

The process of the present invention may be carried out in any manner which insures that the neoprene foam rubber is impregnated with an aqueous wash solution of this invention so as to incorporate sufficient quantities of the fire-proofing components in the foam. For example, the neoprene foam to be fire-proofed may be immersed in a wash bath, so as to incorporate the wash solution in the pores or interstices of the absorbent foam, followed by wringing between squeeze rollers to the desired wash pick-up. The wet foam may then be subjected to elevated temperatures, under dry-heat conditions, to both dry the foam and further resinify the urea-formaldehyde-dihydroxybenzene system, thereby binding the mixture permanently to the foam. Alternatively, the soluble fire-proofing components may be deposited in the foam by evaporation of the water and then resinified by subsequent heating.

It has been found that a preferred dry weight pick-up of total solids incorporated in neoprene foam rubber, for compliance with the "hot bolt test," ranges from about 13 parts to about 25 parts by weight of said solids per 100 parts by weight of neoprene foam rubber. Too low a pick-up will result in failure to pass the "hot bolt test." On the other hand, desirable results can be obtained by using larger amounts of incorporated solids, e.g., up to about 50 parts by weight per 100 parts by weight of neoprene foam rubber. The only limitations that exist on the maximum pick-up are practical factors such as cost, waste, too high a viscosity of solution, and the like.

Passage of the "hot bolt test" appears to be dependent upon immediate formation of a hard, tough, supporting char or crust upon placement of the hot bolt onto the treated foam. It is believed that the resin constituent of the wash controls the speed, depth and strength of the char formation. The char supports the hot bolt preventing it from penetrating deeply into the test sample.

If the type of test for measuring fire-resistance is less rigorous and exacting than the "hot bolt test," it is possible to reduce the amount of dry weight pick-up of total solids incorporated in the foam rubber to considerably lower amounts, e.g., to about 4 parts by weight of said solids per 100 parts by weight of neoprene foam rubber. The optimum level of solids pick-up depends on the degree of fire-resistance desired in the foam rubber.

Example 1

This example illustrates the preparation of a typical wash composition falling within the scope of this invention. The materials are listed in the following table according to dry weight, wet weight and the approximate amounts of dry materials per 100 parts of dry resin.

| | Parts by Weight | | |
|---|---|---|---|
| | Dry | Wet | |
| Permafresh SYN [1] | 24.0 | 38.2 | 100 |
| 1,4-Dihydroxybenzene | 6.15 | 6.15 | 25 |
| Formaldehyde (37% solution) | | 7.88 | 12 |
| Diammonium phosphate | 4.92 | 4.92 | 20 |
| Catalyst AC [2] | 0.47 | 1.23 | 2 |
| Water | | 41.62 | |
| Total | | 100.00 | |
| Percent Total solids content | 35.54 | | |

[1] Approximately 62.5% solution of water-soluble urea-formaldehyde resin supplied by Warwick Chemical Company; 2.1 moles formaldehyde per mole urea.
[2] Approximately 37% aqueous solution of 2-methyl-2-aminopropanol hydrochloride supplied by Monsanto Chemical Company.

The Permafresh SYN, 1,4-dihydroxybenzene and formaldehyde solution were added, with stirring, to the water in a suitable container. The mixture was heated to 180° F., held at this temperature for 10 minutes, and then cooled to 75° F. The diammonium phosphate and catalyst were then added and the mixture was stirred until both were dissolved.

Example 2

This example illustrates that the presence of dihydroxybenzene in the wash composition of this invention is essential for imparting fire-resistant qualities to neoprene foam rubber treated therewith.

A neoprene foam rubber sample, measuring 12" x

12″ x 3″, was impregnated with the fireproofing wash solution prepared in Example 1, passed through squeeze rollers so adjusted as to allow retention of a proper weight of wash solution, precalculated to give the treated sample, after heating for 24 hours at 220° F. under dry-heat conditions, a 22% dry weight pick-up of solids from the wash solution based on the weight of the neoprene. This sample will be referred to a sample 2A.

The following two wash compositions were prepared in which the dihydroxybenzene and the excess portion of formaldehyde that was used to solubilize the dihydroxybenzene were omitted.

|  | Parts by weight | |
|---|---|---|
|  | 2B | 2C |
| Urea-formaldehyde resin [1] | 100 | 100 |
| Diammonium phosphate | 20 | 20 |
| Catalyst AC | 2 | 1.5 |
| Percent water, q.s. total solids content | 35 | 45 |

[1] Approximately 2 moles formaldehyde per mole urea.

Two samples (designated 2B and 2C) of neoprene foam rubber, measuring 12″ x 12″ x 3″, were impregnated with the above washes. Both samples were passed through squeeze rollers and then maintained at 220° F. for 24 hours under dry-heat conditions. Sample 2B recorded a 22%, and sample 2C a 25%, dry weight pick-up of solids based on the weight of the neoprene.

When all three samples were subjected to the "hot bolt test," the following results were obtained:

|  | 2A | 2B | 2C |
|---|---|---|---|
| Smolder time (mins.) | 13 | Flamed and Smoldered | 12 |
| Char Volume (cu. ins.) | 11.2 | Consumed | [1] 25 |

[1] Bolt dropped through sample.

Sample 2A did not break into flame and satisfactorily passed the test limitations for smouldering and charring, whereas samples 2B and 2C, containing no dihydroxybenzene, were completely unsatisfactory.

Example 3

Each of three samples (designated 3A, 3B, and 3C) of neoprene foam rubber, measuring 12″ x 12″ x 3″, was impregnated with one of the following fire-retardant wash compositions, prepared according to the procedure described in Example 1.

|  | Parts by Weight | | |
|---|---|---|---|
|  | 3A | 3B | 3C |
| Urea-formaldehyde resin | 100 | 100 | 100 |
| 1,4-Dihydroxybenzene | 25 |  |  |
| 1,3-Dihydroxybenzene |  | 25.1 |  |
| 1,2-Dihydroxybenzene |  |  | 25.1 |
| 37% Formaldehyde solution | 32 | 32 | 32 |
| Diammonium phosphate | 20 | 20 | 20 |
| Catalyst AC | 1.9 | 1.9 | 1.9 |
| Water, q.s. to total solids content of 36% |  |  |  |

The impregnated neoprene samples were passed through squeeze rollers, and then maintained at 220° F. for 24 hours under dry-heat conditions. After this treatment, the samples contained the following percentages of dry weight pick-up of solids based on the weight of the neoprene.

|  | 3A | 3B | 3C |
|---|---|---|---|
| Percent Dry weight pick-up | 22.6 | 22.5 | 23 |

The three samples were subjected to the "hot bolt test" and the following results were obtained:

|  | 3A | 3B | 3C |
|---|---|---|---|
| Smolder Time (mins.) | 11 | 10 | 9 |
| Char Volume (cu. ins.) | 9.2 | 6.6 | 5.3 |

This example shows the suitability of the three isomeric forms of dihydroxybenzene in the fire-retardant wash compositions of this invention. None of the samples broke into flame and all gave satisfactory results well within the limitations for smoldering and char volume when subjected to the "hot bolt test."

Example 4

The following wash compositions, containing various amounts of dihydroxybenzene per 100 parts of dry resin, were prepared according to the procedure in Example 1.

|  | Parts by Weight | | |
|---|---|---|---|
|  | 4A | 4B | 4C |
| Permafresh SYN | 41.70 | 43.10 | 35.20 |
| 1,4-Dihydroxybenzene | 2.69 | 4.05 | 8.75 |
| Formaldehyde (37% solution) | 3.41 | 5.15 | 11.10 |
| Diammonium phosphate | 5.38 | 5.40 | 4.37 |
| Catalyst AC | 1.25 | 1.45 | 1.25 |
| Water | 45.57 | 40.85 | 39.33 |
| Total | 100.00 | 100.00 | 100.00 |
| Percent total solids content | 35.45 | 36.95 | 35.40 |
| Dihydroxybenzene/dry resin | 10/100 | 15/100 | 40/100 |

Each of three neoprene foam rubber samples designated 4A, 4B and 4C and measuring 12″ x 12″ x 3″, was impregnated with one of the above fireproofing wash solutions and then treated and tested as in the preceding examples. The following observations were recorded:

|  | 4A | 4B | 4C |
|---|---|---|---|
| Percent total solids pick-up | 17.6 | 16.7 | 18.5 |
| Smolder Time (mins.) | 7 | 7 | 10 |
| Char Volume (cu. ins.) | 15 | 7.5 | 7 |

This example illustrates that satisfactory results are obtained when the range for dihydroxybenzene in the wash composition of this invention is from about 10 to about 40 parts by weight per 100 parts of urea-formaldehyde resin. The preferred range is from about 15 to about 40 parts by weight per 100 parts of resin.

Example 5

Each of three samples (designated 5A, 5B and 5C) of neoprene foam rubber, measuring 12″ x 12″ x 3″, was impregnated with one of the following fire-retardant wash compositions, prepared according to the procedure described in Example 1.

|  | Parts by weight | | |
|---|---|---|---|
|  | 5A | 5B | 5C |
| Urea-formaldehyde resin | 100 | 100 | 100 |
| 1,4-Dihydroxybenzene | 25 | 25 | 25 |
| 37% Formaldehyde solution | 32 | 32 | 32 |
| Monoammonium phosphate | 20 |  |  |
| Ammonium chloride |  | 20 |  |
| Phosphoric acid |  |  | 20 |
| Catalyst AC | 1.9 | 1.9 | 1.9 |
| Water, q.s. to total solids content of 36% |  |  |  |

The impregnated neoprene samples were passed through squeeze rollers, heated and dried as in the preceding examples and, after treatment, contained the following percentages of dry weight pick-up of solids from the wash solutions, based on the weight of the neoprene.

|  | 5A | 5B | 5C |
|---|---|---|---|
| Percent dry weight pick-up | 21 | 22 | 20 |

The three samples were subjected to the "hot bolt test" and the following results were obtained.

|  | 5A | 5B | 5C |
|---|---|---|---|
| Smolder Time (mins.) | 9 | 14 | 9 |
| Char Volume (cu. ins.) | 6.3 | 11.6 | 8.5 |

This example shows that various spumifics may be used in accordance with the invention.

*Example 6*

This example illustrates the effect of varying the amount of spumific in our wash composition. Each of two samples (designated 6A and 6B) of neoprene foam rubber, measuring 12" x 12" x 3", was impregnated with one of the following fire-retardant wash compositions, prepared according to the procedure described in Example 1.

|  | Parts by weight | |
|---|---|---|
|  | 6A | 6B |
| Urea-formaldehyde resin | 100 | 100 |
| 1,4-Dihydroxybenzene | 25 | 25 |
| 37% Formaldehyde solution | 32 | 32 |
| Diammonium phosphate | 15 | 30 |
| Catalyst AC | 2 | 2 |
| Percent water, q.s. to total solids content | 34 | 38 |

The impregnated neoprene samples were passed through squeeze rollers, heated and dried as in the preceding examples and, after treatment, each contained 22% dry weight pick-up of solids based on the weight of the sample. When the samples were subjected to the "hot bolt test," neither broke into flame and the following results were obtained.

|  | 6A | 6B |
|---|---|---|
| Smolder Time (mins.) | 13 | 14 |
| Char Volume (cu. ins.) | 12.5 | 11.4 |

*Example 7*

This example illustrates the effectiveness of the wash composition of this invention even when a very low percentage pick-up of total solids is incorporated in the neoprene foam rubber. Samples of neoprene foam rubber, measuring 12" x 12" x 3", were treated as in the preceding examples with the fire-resistant wash composition described in Example 1 to obtain various dry weight pick-up of solids ranging from 1% to 19.1% based on the weight of the neoprene. In order to obtain the lower percent pick-ups shown in the table below, the wash composition of Example 1 was used in diluted form. Using a non-treated sample as a control, all of the samples were subjected to the following test.

A Bunsen burner having a flame height of 6" was placed 4" below the surface of a neoprene foam sample, so that 2" of flame impinged on the foam. The flame was maintained in contact with the sample for 30 seconds, and then removed. The smolder time and the percent weight loss due to both smoldering and charring were recorded.

| Percent Dry Weight Pick-Up of Solids | Smolder Time (minutes) | Percent Weight Loss | | |
|---|---|---|---|---|
|  |  | Smolder | Char | Total |
| 0 | 55 | 75 | 25 | 100 |
| 1 | 43 | 73 | 27 | 100 |
| 4.4 | 3 | 1.6 | 2.4 | 4 |
| 7.7 | 3 | 0.8 | 2.3 | 3.1 |
| 9.7 | 3 | 0 | 2.9 | 2.9 |
| 14.0 | 3 | 0 | 2.9 | 2.9 |
| 15.3 | 3 | 0 | 2.8 | 2.8 |
| 19.1 | 3 | 0 | 2.1 | 2.1 |

This example illustrates that satisfactory results are attained with the compositions of the invention at low dry weight pick-ups of about 4 percent.

*Example 8*

Samples of neoprene foam rubber, measuring 12" x 12" x 3", were impregnated with the fireproofing wash solution prepared in Example 1, and treated as in the preceding examples so as to retain various percentages of dry weight pick-up of solids from the wash solution based on the weight of the sample. When subjected to the "hot bolt test," the following observations were recorded.

| Sample | Percent Pick-Up Total Solids | Smolder Time (minutes) | Char Volume (cu. ins.) |
|---|---|---|---|
| 8A | 13.9 | 10 | 7.0 |
| 8B | 17.5 | 10 | 7.7 |
| 8C | 18.5 | 10 | 9.7 |
| 8D | 22.6 | 11 | 9.2 |

This example illustrates that compliance with the "hot bolt test" is attained when the dry-weight pickup of total solids ranges from about 13 to about 25 percent, based on the weight of the neoprene.

*Example 9*

This example illustrates the improved wet storage life of our wash composition and its adaptability for masterbatching. The following wash was prepared in accordance with the procedure outlined in Example 1. The materials are listed according to dry weight, wet weight and the approximate amounts of dry materials per 100 parts of dry resin.

|  | Parts by Weight | | |
|---|---|---|---|
|  | Dry | Wet |  |
| Permafresh SYN | 24.30 | 38.90 | 100 |
| 1,4-Dihydroxybenzene | 6.29 | 6.29 | 26 |
| Formaldehyde (37% solution) |  | 8.05 | 12 |
| Diammonium phosphate | 5.02 | 5.02 | 21 |
| Catalyst AC | 0.46 | 1.26 | 2 |
| Water |  | 40.48 |  |
| Total |  | 100.00 |  |
| Percent Total solids content | 36.07 |  |  |

After the diammonium phosphate and catalyst are added and dissolved, the pot life of this wash was approximately 24 hours. If the diammonium phosphate and catalyst are withheld, and resultant solution has an indefinite pot life with no resinification to a solid state having been observed after a one year period.

Thus, the fireproofing solution of this invention could be made in very large quantities through the heating and cooling cycles and held at this stage of preparation as a masterbatch. Portions of this masterbatch could be drawn off as needed and the spumific and catalyst thereupon added. Upon this addition, the pot life will be approximately 24 hours. Using this technique on a large scale, labor, waste, expenses and the like could be greatly reduced.

In contrast, the following melamine-aldehyde wash was prepared. It was observed to gel in 2½ hours.

|  | Parts by Weight | | |
|---|---|---|---|
|  | Dry | Wet |  |
| Resloom HP[3] | 35.10 | 35.10 | 100 |
| Diammonium phosphate | 7.02 | 7.02 | 20 |
| Catalyst AC | 0.67 | 1.75 | 2 |
| Water |  | 56.13 |  |
| Total |  | 100.00 |  |
| Percent Total solids content | 42.79 |  |  |

[3] A 100% methylol-melamine resin in white crystalline powder form supplied by Monsanto Chemical Company.

Example 10

A sample section (10A) taken from a commercial neoprene foam rubber mattress, which mattress had been impregnated with the wash composition of Example 1, had a smolder time of 7 minutes when subjected to the "hot bolt test." The remainder of the mattress was given two passes through a mattress washer consisting of a series of water sprays and squeeze rollers, the water temperature being 140° F. It was then redried and the "hot bolt test" was repeated on another sample section (10B) taken from the mattress.

Sample: Smolder time, mins.
10A _____ 7
10B _____ 8

The char volumes of the samples were well within the limitation of the test.

Example 11

A sample section taken from a commercial neoprene foam mattress, impregnated with the wash composition of Example 1, had a smolder time of 8 minutes when subjected to the "hot bolt test." The sample was subjected to a 30 minute live steam treatment and then subjected to the "hot bolt test."

Smolder time, mins.
Before steam treatment_____ 8
After steam treatment_____ 8

The char volumes in both tests were well within the limitation of the test.

The preceding Examples 10 and 11 illustrate the durability of the fire-resistance property which is imparted to neoprene foam rubber in accordance with the invention.

Example 12

This example illustrates that the absence of added catalyst from the wash composition of the invention is not critical. A wash comprised of the following formulation was prepared according to the procedure outlined in Example 1. The materials are listed according to dry weight, wet weight and the approximate amounts of dry materials per 100 parts of dry resin.

|  | Parts by Weight | | |
|---|---|---|---|
|  | Dry | Wet |  |
| Permafresh SYN | 24.6 | 39.4 | 100 |
| 1,4-Dihydroxybenzene | 6.4 | 6.4 | 26 |
| Formaldehyde (37% solution) |  | 8.1 | 12 |
| Diammonium phosphate | 5.0 | 5.0 | 20 |
| Water |  | 41.1 |  |
| Total |  | 100.0 |  |
| Percent total solids content | 36.0 |  |  |

A neoprene foam rubber sample, measuring

12″ x 12″ x 3″ was impregnated with the above fireproofing wash solution and passed through squeeze rollers to remove a major portion of the wash. The sample was maintained at 250° F. for 15 hours under dry-heat conditions, resulting in a 22% dry weight pick-up of solids based on the weight of the sample. When subjected to the "hot bolt test," no flaming was apparent and little charring was observed, the smolder time being 11 minutes.

Example 13

This example illustrates a wash composition according to the invention in which no separately added portion of formaldehyde was included. The materials are listed in the following table according to dry weight, wet weight and the approximate amounts of dry materials per 100 parts of dry resin.

|  | Parts by Weight | | |
|---|---|---|---|
|  | Dry | Wet |  |
| U.F.-85 Concentrate [4] | 27.0 | 31.8 | 100 |
| 1,4-Dihydroxybenzene | 7.95 | 7.95 | 30 |
| Diamonium phosphate | 7.95 | 7.95 | 30 |
| Catalyst UTX [5] | 0.56 | 1.60 | 2 |
| Water |  | 50.7 |  |
| Total |  | 100.00 |  |
| Percent total solids content | 43.46 |  |  |

[4] Approximately 85% solution of water soluble ureaformaldehyde resin supplied by Allied Chemical and Dye Corporation; urea: 26%—formaldehyde: 59%
[5] An hydroxy alkyl amine hydrochloride catalyst marketed by American Cyanamid Company.

The UF-85 Concentrate, 1,4-dihydroxybenzene and water were mixed in a suitable container, heated at 120° F. to cause solution, and cooled to room temperature. The diammonium phosphate and catalyst were then added and the mixture was stirred until both were dissolved.

A neoprene foam rubber sample, measuring

12″ x 12″ x 3″ was impregnated with the above fireproofing wash solution and passed through squeeze rollers to remove most of the wash. The sample was maintained at 220° F. for 24 hours, under dry-heat conditions, after which the sample recorded a 17% dry weight pick-up of solids from the wash solution, based on the weight of the neoprene. When subjected to the "hot bolt test," a small amount of charring was observed and the smolder time was 12 minutes.

Example 14

A 90/10 foam of neoprene and natural rubber (sample 14A) and a 95/5 foam of neoprene and styrene-butadiene rubber (SBR) having a styrene content of 30% (sample 14B) were impregnated with the fireproofing wash solution prepared in Example 1. The two samples, each measuring 12″ x 12″ x 3″, were treated and tested as in the preceding examples. The following observations were recorded.

| Sample | Blend | Percent Pick-Up Total Solids | Smolder Time (minutes) | Char Volume (cu. ins.) |
|---|---|---|---|---|
| 14A | 90/10 Neoprene/natural rubber | 20 | 10 | 7 |
| 14B | 95/5 Neoprene/SBR | 21 | 13 | 8 |

This example shows that the wash composition of this invention can be used to impart fire-resistance to foam rubbers made from mixtures of neoprene with natural or other synthetic rubbers, which mixtures contain neoprene as the major elastomeric constituent.

Neoprene foam rubber treated with a composition made in accordance with this invention will be substantially fireproofed. It is to be understood that the above described embodiments are merely illustrative of our invention. Numerous variations and modifications may be devised by those skilled in the art without departing from the spirit and scope of the invention which is to be determined by the appended claims.

Having thus described our invention, what we claim and desire to protect by Letters Patent is:

1. A method of improving the combustion-resistance of chloroprene polymer foam rubber which comprises impregnating said foam rubber with an aqueous mixture comprised of (A) urea-formaldehyde resin wherein the formaldehyde is present in a ratio of between 1 and 2.5 moles per mole of urea, (B) from about 10 to about 40 parts by weight of dihydroxybenzene per 100 parts of said resin, (C) up to about 15 parts by weight of excess formaldehyde per 100 parts of said resin, (D) from about 10 to about 35 parts by weight of a foam-producing substance selected from the group consisting of diammonium phosphate, monoammonium phosphate, phosphoric acid, ammonium sulfate and ammonium chloride per 100 parts of said resin, the total solids incorporated in 100 parts by weight of said foam rubber being from about 4 to about 50 parts by weight.

2. The method of claim 1 wherein said dihydroxybenzene is 1,4-dihydroxybenzene.

3. The method of claim 1 wherein said dihydroxybenzene is 1,3-dihydroxybenzene.

4. The method of claim 1 wherein said dihydroxybenzene is 1,2-dihydroxybenzene.

5. A method of improving the combustion-resistance of chloroprene polymer foam rubber which comprises immersing said foam rubber in an aqueous mixture comprised of (A) urea-formaldehyde resin wherein the formaldehyde is present in a ratio of between 1 and 2.5 moles per mole of urea, (B) from about 10 to about 40 parts by weight of dihydroxybenzene per 100 parts of said resin, (C) up to about 15 parts by weight of excess formaldehyde per 100 parts of said resin, and (D) from about 10 to about 35 parts by weight of a foam-producing substance selected from the group consisting of diammonium phosphate, monoammonium phosphate, phosphoric acid, ammonium sulfate and ammonium chloride per 100 parts of said resin, so as to incorporate said mixture in said foam rubber to the extent of from about 13 to about 25 parts by weight of total solids per 100 parts by weight of said foam rubber, and subsequently heating the treated foam to dry said foam and bind said mixture thereto.

6. A method of improving the combustion-resistance of chloroprene polymer foam rubber which comprises immersing said foam rubber in an aqueous mixture comprised of (A) urea-formaldehyde resin wherein the formaldehyde is present in a ratio of between 1 and 2.5 moles per mole of urea, (B) from about 15 to about 40 parts by weight of 1,4-dihydroxybenzene per 100 parts of said resin, (C) up to about 15 parts by weight of excess formaldehyde per 100 parts of said resin, and (D) from about 15 to about 30 parts of diammonium phosphate per 100 parts of said resin, so as to incorporate said mixture in said foam rubber to the extent of from about 13 to about 25 parts by weight of total solids per 100 parts by weight of said foam rubber, and subsequently heating the treated foam to dry said foam and bind said mixture thereto.

7. A fire-resistant foam rubber comprising a chloroprene polymer foam rubber containing, per 100 parts by weight of said chloroprene polymer foam, from about 4 to about 50 parts by weight of a mixture comprised of (A) urea-formaldehyde resin wherein the formaldehyde is present in a ratio of between 1 and 2.5 moles per mole of urea, (B) from about 10 to about 40 parts by weight of dihydroxybenzene per 100 parts of said resin, (C) up to about 15 parts by weight of excess formaldehyde per 100 parts of said resin, and (D) from about 10 to about 35 parts by weight of a foam-producing substance selected from the group consisting of diammonium phosphate, monoammonium phosphate, phosphoric acid, ammonium sulfate and ammonium chloride per 100 parts of said resin.

8. The fire-resistant foam rubber of claim 7 wherein said dihydroxybenzene is 1,4-dihydroxybenzene and said 1,4-dihydroxybenzene is present in an amount from about 15 to about 40 parts by weight per 100 parts of said resin.

9. A chloroprene polymer foam rubber containing, per 100 parts by weight of said foam rubber, from about 13 to about 25 parts by weight of a mixture comprised of (A) urea-formaldehyde resin wherein the formaldehyde is present in a ratio of between 1 and 2.5 moles per mole of urea, (B) from about 15 to about 40 parts by weight of 1,4-dihydroxybenzene per 100 parts of said resin, (C) up to about 15 parts by weight of excess formaldehyde per 100 parts of said resin, and (D) from about 15 to about 30 parts by weight of diammonium phosphate per 100 parts of said resin, whereby said foam rubber is essentially fire-resistant when subjected to combustion temperatures.

10. A composition for improving the combustion-resistance of chloroprene polymer foam rubber which comprises (A) urea-formaldehyde resin wherein the formaldehyde is present in a ratio of between 1 and 2.5 moles per mole of urea, (B) from about 10 to about 40 parts by weight of dihydroxybenzene per 100 parts of said resin, (C) up to about 15 parts by weight of excess formaldehyde per 100 parts of said resin, and (D) from about 10 to about 35 parts by weight of a foam-producing substance selected from the group consisting of diammonium phosphate, monoammonium phosphate, phosphoric acid, ammonium sulfate and ammonium chloride per 100 parts of said resin, said composition when dissolved in water is suitable for use in impregnating said foam rubber to impart fire-resistance thereto.

11. The composition of claim 10 wherein said dihydroxybenzene is 1,4-dihydroxybenzene.

12. The composition of claim 10 wherein said dihydroxybenzene is 1,3-dihydroxybenzene.

13. The composition of claim 10 wherein said dihydroxybenzene is 1,2-dihydroxybenzene.

14. A composition for improving the combustion-resistance of chloroprene polymer foam rubber comprising an aqueous solution of (A) urea-formaldehyde resin wherein the formaldehyde is present in a ratio of between 1 and 2.5 moles per mole of urea, (B) from about 15 to about 40 parts by weight of 1,4-dihydroxybenzene per 100 parts of said resin, (C) up to about 15 parts by weight of excess formaldehyde per 100 parts of said resin, and (D) from about 10 to about 35 parts by weight of a foam-producing substance selected from the group consisting of diammonium phosphate, monoammonium phosphate, phosphoric acid, ammonium sulfate and ammonium chloride per 100 parts of said resin, the combined weight of A, B, C and D in said aqueous solution being sufficient to impart fire-resistance to chloroprene polymer foam rubber when said foam is impregnated with said aqueous solution.

No references cited.